United States Patent
Iwamura

(10) Patent No.: US 8,282,719 B2
(45) Date of Patent: *Oct. 9, 2012

(54) WATER-BASED INK FOR INK-JET RECORDING, INK CARTRIDGE, INK-JET RECORDING APPARATUS AND METHOD OF STABILIZING WATER-BASED INK FOR INK-JET RECORDING

(75) Inventor: Yuko Iwamura, Nagoya (JP)

(73) Assignee: Brother Kogyo Kabushiki Kaisha, Nagoya-shi, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/443,988

(22) Filed: Apr. 11, 2012

(65) Prior Publication Data

US 2012/0192759 A1  Aug. 2, 2012

Related U.S. Application Data

(63) Continuation of application No. 12/342,771, filed on Dec. 23, 2008, now Pat. No. 8,177,898.

(30) Foreign Application Priority Data

Dec. 28, 2007 (JP) ................. 2007-338536
Dec. 28, 2007 (JP) ................. 2007-338539

(51) Int. Cl.
*C09D 11/02* (2006.01)
*B41J 2/01* (2006.01)

(52) U.S. Cl. ............... 106/31.48; 106/31.58; 347/100

(58) Field of Classification Search ............ 106/31.48, 106/31.58; 347/100
See application file for complete search history.

(56) References Cited

U.S. PATENT DOCUMENTS

| | | | |
|---|---|---|---|
| 7,465,347 B2 | 12/2008 | Kitamura et al. | |
| 7,553,358 B2 | 6/2009 | Okamura et al. | |
| 7,731,788 B2 | 6/2010 | Kitamura et al. | |
| 7,736,427 B2 | 6/2010 | Kitamura et al. | |
| 8,128,747 B2* | 3/2012 | Ogura et al. | 106/31.48 |
| 2006/0016368 A1 | 1/2006 | Ozawa et al. | |
| 2008/0145561 A1 | 6/2008 | Kitamura et al. | |
| 2008/0145562 A1 | 6/2008 | Kitamura et al. | |
| 2008/0257209 A1 | 10/2008 | Kitamura et al. | |
| 2008/0274283 A1 | 11/2008 | Tateishi et al. | |
| 2008/0274285 A1 | 11/2008 | Okamura et al. | |
| 2009/0165672 A1 | 7/2009 | Ogura et al. | |
| 2009/0167830 A1* | 7/2009 | Iwamura | 106/31.48 |

FOREIGN PATENT DOCUMENTS

| | | |
|---|---|---|
| JP | 10-036736 | 2/1998 |
| JP | 10-060340 | 3/1998 |
| JP | 2000-026781 | 1/2000 |
| JP | 2007-063520 | 3/2007 |
| JP | 2007-138124 | 6/2007 |
| JP | 2007-191590 | 8/2007 |
| JP | 2007-191644 A | 8/2007 |
| JP | 2009-001662 A | 1/2009 |
| JP | 2009155605 A | 7/2009 |
| WO | 2006082669 A1 | 8/2006 |

OTHER PUBLICATIONS

Office Action for corresponding Japanese Patent Application No. 2007-338536 dated Feb. 16, 2012.
Office Action for corresponding Japanese Patent Application No. 2007-338539 dated Feb. 16, 2012.

* cited by examiner

*Primary Examiner* — Helene Klemanski
(74) *Attorney, Agent, or Firm* — Banner & Witcoff, Ltd.

(57) ABSTRACT

A water-based ink for ink-jet recording includes a coloring agent and water. The coloring agent includes a dye represented by the following general formula (1). In the ink, an amount of glycerin is set so as to satisfy the following condition (A).

$$3.5X-5 \leq Y1 \leq 3.5X \quad (A)$$

X: an amount of a dye represented by general formula (1) relative to a total amount of the ink (wt %)

Y1: an amount of glycerin relative to a total amount of the ink (wt %)

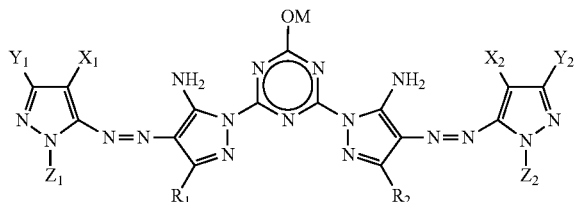

(1)

16 Claims, 4 Drawing Sheets

WATER-BASED INK FOR INK-JET RECORDING, INK CARTRIDGE, INK-JET RECORDING APPARATUS AND METHOD OF STABILIZING WATER-BASED INK FOR INK-JET RECORDING

CROSS-REFERENCE TO RELATED APPLICATION

This is a continuation of U.S. application Ser. No. 12/342,771, filed Dec. 23, 2008, now U.S. Pat. No. 8,177,898, the disclosure of which is hereby incorporated by reference. This application claims priority from Japanese Patent Application Nos. 2007-338536 and 2007-338539 filed on Dec. 28, 2007. The entire subject matter of the Japanese Patent Applications is incorporated herein by reference.

BACKGROUND

Conventionally, as an ink for ink-jet recording, an ink is known that contains dye, ethylene glycol, glycerin, and the like. The ink is required to be (i) not deteriorated in prolonged storage and good in preservation stability, (ii) not aggregated due to contact with a pigment ink even in a case where the ink is used in combination with the pigment ink in an ink-jet recording apparatus and good in ejection stability, and (iii) good in toughness such as light resistance and ozone resistance of a recording material. However, there were no conventional inks that satisfy all of the aforementioned performances.

SUMMARY

A first water-based ink for ink-jet recording is a water-based ink for ink-jet recording comprising a coloring agent and water. The coloring agent comprises a dye represented by the following general formula (1). In the ink, an amount of glycerin is set so as to satisfy the following condition (A).

$$3.5X-5 \leq Y1 \leq 3.5X \quad (A)$$

X: an amount of a dye represented by general formula (1) relative to a total amount of the ink (wt %)
Y1: an amount of glycerin relative to a total amount of the ink (wt %)

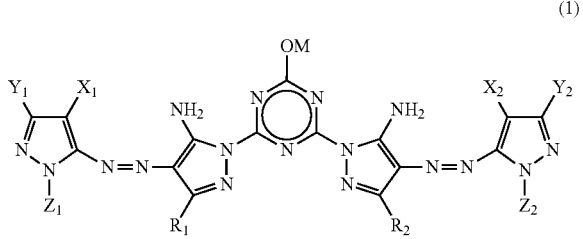

(1)

wherein in the general formula (1),
$R_1$, $R_2$, $Y_1$, and $Y_2$ each represents a monovalent group, provided that $R_1$, $R_2$, $Y_1$, and $Y_2$ may be the same or different;
$X_1$ and $X_2$, each independently, represents an electron attractive group, provided that $X_1$ and $X_2$ may be the same or different;
$Z_1$ and $Z_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that $Z_1$ and $Z_2$ may be the same or different; and
M represents a hydrogen atom, or a cation.

The X and Y1 may strictly satisfy the condition (A) or may be placed at neighborhood of the straight line of Y1=3.5X−5 in Y1<3.5X−5 and the straight line of Y1=3.5X in Y1>3.5X.

A second water-based ink for ink-jet recording is a water-based ink for ink-jet recording comprising a coloring agent and water. The coloring agent comprises a dye represented by the general formula (1). In the ink, an amount of ethylene glycol is set so as to satisfy the following condition (D).

$$3.5X-5 \leq Y2 \leq X+10 \quad (D)$$

X: an amount of a dye represented by general formula (1) relative to a total amount of the ink (wt %)
Y2: an amount of ethylene glycol relative to a total amount of the ink (wt %)

The X and Y2 may strictly satisfy the condition (D) or may be placed at neighborhood of the straight line of Y2=3.5X−5 in Y2<3.5X−5 and the straight line of Y2=X+10 in Y2>X+10.

An ink cartridge comprises the first or the second water-based ink for ink-jet recording.

An ink-jet recording apparatus comprises the ink cartridge and an ink ejection unit. The water-based ink for ink-jet recording comprised in the ink cartridge is ejected from the ink ejection unit.

A method of stabilizing a first water-based ink for ink-jet recording is a method of stabilizing a water-based ink for ink-jet recording comprising a coloring agent and water. The coloring agent comprises a dye represented by the general formula (1). The ink is stabilized by setting an amount of glycerin so as to satisfy the condition (A) in the ink.

A method of stabilizing a second water-based ink for ink-jet recording is a method of stabilizing a water-based ink for ink-jet recording comprising a coloring agent and water. The coloring agent comprises a dye represented by the general formula (1). The ink is stabilized by setting an amount of ethylene glycol so as to satisfy the condition (D) in the ink.

DETAILED DESCRIPTION

Figure 1:
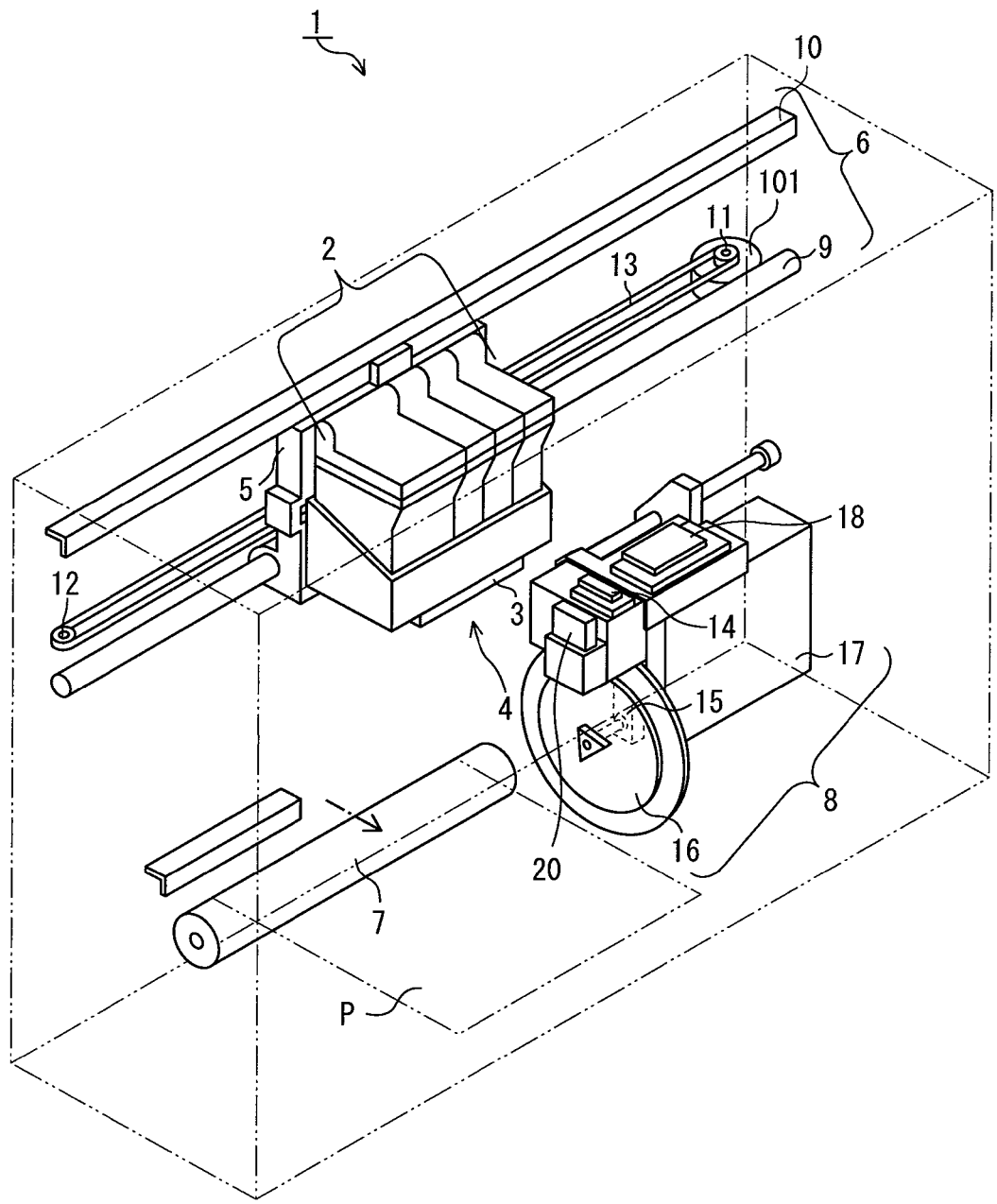
FIG. 1 is a schematic perspective view showing a construction of an example of an ink-jet recording apparatus.

With respect to the first water-based ink for ink-jet recording, in a case of X>5/3.5, glycerin may be comprised in the first water-based ink for ink-jet recording in an amount satisfying the condition (A), and in a case of X≤5/3.5, glycerin may be comprised in the water-based ink in an amount satisfying the following condition (B).

$$0 < Y1 \leq 3.5X \quad (B)$$

X: an amount of a dye represented by general formula (1) relative to a total amount of the ink (wt %)

Y1: an amount of glycerin relative to a total amount of the ink (wt %)

In the case of $X \leq 5/3.5$, the X and Y1 may strictly satisfy the condition (B) or may be placed at neighborhood of the straight line of Y1=3.5X in Y1>3.5X.

With respect to the first water-based ink for ink-jet recording, in a case of $X \leq 5/3.5$, glycerin may not be comprised in the first water-based ink for ink-jet recording. In this manner, in a case where an amount of a dye represented by the general formula (1) is small, a water-based ink may be obtained that is good in ejection stability and hardly generates the aggregation even when glycerin is not comprised.

The first water-based ink for ink-jet recording further may satisfy the following condition (C).

(C) an amount of a dye represented by general formula (1) exceeds 0 wt % and is equal to or less than about 7 wt % relative to a total amount of the ink With respect to the second water-based ink for ink-jet recording, in a case of $X>5/3.5$, ethylene glycol may be comprised in the second water-based ink for ink-jet recording in an amount satisfying the condition (D), and in a case of $X \leq 5/3.5$, ethylene glycol may be comprised in the water-based ink in an amount satisfying the following condition (E).

$$0 < Y2 \leq X+10 \quad (E)$$

X: an amount of a dye represented by general formula (1) relative to a total amount of the ink (wt %)

Y2: an amount of ethylene glycol relative to a total amount of the ink (wt %)

In the case of $X \leq 5/3.5$, the X and Y2 may strictly satisfy the condition (E) or may be placed at neighborhood of the straight line of Y2=X+10 in Y2>X+10.

With respect to the second water-based ink for ink-jet recording, in a case of $X \leq 5/3.5$, ethylene glycol may not be comprised in the second water-based ink for ink-jet recording. In this manner, in a case where an amount of a dye represented by the general formula (1) is small, a water-based ink may be obtained that is good in ejection stability and hardly generates the aggregation even when ethylene glycol is not comprised.

The second water-based ink for ink-jet recording further may satisfy the following condition (F).

(F) an amount of a dye represented by general formula (1) exceeds 0 wt % and is equal to or less than about 6 wt % relative to a total amount of the ink Application of the first and the second water-based ink for ink-jet recording is not particularly limited and, for example, may be used as a water-based yellow ink. The first and the second water-based ink for ink-jet recording may be used as a water-based ink other than a yellow color by further comprising coloring agents other than the dye represented by the general formula (1).

Next, the first water-based ink for ink-jet recording (hereinafter, also may simply be referred to as "first water-based ink" or "first ink") is explained. The first water-based ink comprises a coloring agent and water. As described above, the coloring agent comprises the dye represented by the general formula (1).

In the general formula (1), $R_1$, $R_2$, $Y_1$, and $Y_2$ each represents a monovalent group, provided that $R_1$, $R_2$, $Y_1$, and $Y_2$ may be the same or different. The monovalent group is a hydrogen atom, or a monovalent substituent. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxy carbonyloxy group, an amino group, an amido group, an acylamino group, an ureido group, an amino carbonyl amino group, an alkoxy carbonyl amino group, an aryloxy carbonyl amino group, a sulfamoyl amino group, an alkyl sulfonyl amino group, an aryl sulfonyl amino group, an alkyl thio group, an aryl thio group, a heterocyclic thio group, a sulfamoyl group, an alkyl sulfinyl group, an aryl sulfinyl group, an alkyl sulfonyl group, an aryl sulfonyl group, an acyl group, an aryloxy carbonyl group, an alkoxy carbonyl group, a carbamoyl group, a phosphino group, a phosphinyl group, a phosphinyloxy group, a phosphinyl amino group, a silyl group, an azo group, an imido group and the like. Each may further have a monovalent substituent. Out of these, preferred is a hydrogen atom, a halogen atom, an alkyl group, an aryl group, a heterocyclic group, a cyano group, an alkoxy group, an amido group, an ureido group, an alkyl sulfonyl amino group, an aryl sulfonyl amino group, a sulfamoyl group, an alkyl sulfonyl group, an aryl sulfonyl group, a carbamoyl group, or an alkoxy carbonyl group. Particularly, a hydrogen atom, an alkyl group, an aryl group, a cyano group, or an alkyl sulfonyl group is preferred.

The halogen atom is a chlorine atom, a bromine atom, or an iodine atom. Out of these, a chlorine atom, or a bromine atom is preferred.

The alkyl group includes a substituted or unsubstituted alkyl group. The substituted or unsubstituted alkyl group may be an alkyl group having 1 to 30 carbon atoms. Examples of the alkyl group include a methyl group, an ethyl group, a butyl group, a t-butyl group, an n-octyl group, an eicosyl group, a 2-chloroethyl group, a hydroxyethyl group, a cyano ethyl group, a 4-sulfobutyl group and the like. As the examples of the substituent of the substituted alkyl group include a straight chain or branched alkyl group having 1 to 12 carbon atoms such as a methyl group, an ethyl group, a propyl group, an isopropyl group, a sec-butyl group, a t-butyl group, a 2-ethylhexyl group, a 2-methyl sulfonyl ethyl group, a 3-phenoxypropyl group, a trifluoromethyl group and the like; a straight chain or branched aralkyl group having 7 to 18 carbon atoms; a straight chain or branched alkenyl group having 2 to 12 carbon atoms; a straight chain or branched alkynyl group having 2 to 12 carbon atoms; a straight chain or branched cycloalkyl group having 3 to 12 carbon atoms such as a cyclopentyl group and the like; a straight-chain or branched cycloalkenyl group having 3 to 12 carbon atoms; a halogen atom such as a chlorine atom, a bromine atom and the like; an aryl group such as a phenyl group, a 4-t-butylphenyl group, a 2,4-di-t-amyl phenyl group and the like; a heterocyclic group such as an imidazolyl group, a pyrazolyl group, a thoriazolyl group, a 2-furyl group, a 2-thienyl group, a 2-pyrimidinyl group, a 2-benzothiazolyl group and the like; a cyano group; a hydroxyl group; a nitro group; a carboxy group; an amino group; an alkoxy group such as a methoxy group, an ethoxy group, a 2-methoxyethoxy group, a 2-methyl sulfonyl ethoxy group and the like; an aryloxy group such as a phenoxy group, a 2-methyl phenoxy group, a 4-t-butyl phenoxy group, a 3-nitro phenoxy group, a 3-t-butyloxy carbonyl phenoxy group, a 3-methoxy carbonylphenyloxy group and the like; an acylamino group such as an acetamide group, a benzamide group, a 4-(3-t-butyl-4-hydroxy phenoxy)butane amide group and the like; an alkylamino group such as a methylamino group, a butylamino group, a diethylamino group, a methyl butylamino group and the like; an aryl amino group such as a phenyl amino group, a 2-chloroanilino group and the like; an ureido group such as a phenylureido group, a methylureido group, an N,N-dibutylureido group and the like; a sulfamoyl amino group such as an N,N-dipropyl sulfamoyl amino group and the like; an alkyl thio group such as a methyl thio group, an octyl thio group, a 2-phenoxyethyl thio group and the like; an aryl thio group such as a phenyl thio group, a 2-butoxy-5-t-octylphenyl thio group, a 2-carboxy phenyl thio group and the like; an alkyloxy carbonyl amino group such as a methoxy carbonyl amino group and the like; an alkyl sulfonyl amino group such as a methyl sulfonyl amino group and the like; an aryl sulfonyl amino group such as a phenyl sulfonyl amino group, a p-toluene sulfonyl amino group and the like; a carbamoyl group such as an N-ethyl carbamoyl group, an N,N-dibutyl carbamoyl group and the like; a sulfamoyl group such as an N-ethyl sulfamoyl group, an N,N-dipropyl sulfamoyl group, an N-phenyl sulfamoyl group and the like; a sulfonyl group such as a methyl sulfonyl group, an octyl sulfonyl group, a phenyl sulfonyl group, a p-toluene sulfonyl group and the like; an alkyloxy carbonyl group such as a methoxy carbonyl group, a butyloxy carbonyl group and the like; a heterocyclic oxy group such as a 1-phenyltetrazol-5-oxy group, a 2-tetrahydropyranyloxy group and the like; an azo group such as a phenylazo group, a 4-methoxyphenyl azo group, a 4-pivaloylamino phenylazo group, a 2-hydroxy-4-propanoyl phenylazo group and the like; an acyloxy group such as an acetoxy group and the like; a carbamoyloxy group such as an N-methyl carbamoyloxy group, an N-phenylcarbamoyloxy group and the like; a silyloxy group such as a trimethyl silyloxy group, a dibutyl methyl silyloxy group and the like; an aryloxy carbonyl amino group such as a phenoxy carbonyl amino group and the like; an imido group such as an N-succinimido group, an N-phthalimido group and the like; a heterocyclic thio group such as a 2-benzothiazolyl thio group, a 2,4-di-phenoxy-1,3,5-triazole-6-thio group, a 2-pyridylthio group and the like; a sulfinyl group such as a 3-phenoxypropyl sulfinyl group and the like; a phosphonyl group such as a phenoxy phosphonyl group, an octyloxy phosphonyl group, a phenyl phosphonyl group and the like; an aryloxy carbonyl group such as a phenoxy carbonyl group and the like; an acyl group such as an acetyl group, a 3-phenyl propanoyl group, a benzoyl group and the like; and ionic hydrophilic groups such as a carboxyl group, a sulfo group, phosphono group, a quaternary ammonium group and the like. With respect to the alkyl group, the aralkyl group, the alkenyl group, the alkynyl group, the cycloalkyl group, and the cycloalkenyl group, which are the substituent of the substituted alkyl group, those having branched chains are preferable because they improve the solubility of the dye and the stability of the ink; and those having asymmetric carbons are particularly preferred. Out of these, a hydroxy group, an alkoxy group, a cyano group, a halogen atom, a sulfo group (which may also be in the form of a salt) or a carboxyl group (which may also be in the form of a salt) is preferred.

The cycloalkyl groups include a substituted or unsubstituted cycloalkyl group. The substituted or unsubstituted cycloalkyl group may be a cycloalkyl group having 5 to 30 carbon atoms. Examples of the substituent of the substituted cycloalkyl group include the substituents described for the substituted alkyl group. Examples of the cycloalkyl group include a cyclohexyl group, a cyclopentyl group, a 4-n-dodecyl cyclohexyl group and the like.

The aralkyl groups include a substituted or unsubstituted aralkyl group. The substituted or unsubstituted aralkyl group may be an aralkyl group having 7 to 30 carbon atoms. Examples of the substituent of the substituted aralkyl group include the substituents described for the substituted alkyl group. Examples of the aralkyl group include a benzyl group, a 2-phenethyl group and the like.

The alkenyl groups include a straight-chain, branched, or cyclic substituted or unsubstituted alkenyl group. A substituted or unsubstituted alkenyl group may have 2 to 30 carbon atoms. Examples of the substituent of the substituted alkenyl group include the substituents described for the substituted alkyl group. Examples of the alkenyl group include a vinyl group, an allyl group, a prenyl group, a geranyl group, an oleyl group, a 2-cyclopenten-1-yl group, a 2-cyclohexen-1-yl group and the like.

The alkynyl groups are a substituted or unsubstituted alkynyl group having 2 to 30 carbon atoms. Examples of the substituent of the substituted alkynyl group include the substituents described for the substituted alkyl group. Examples of the alkynyl group include an ethynyl group, a propargyl group and the like.

The aryl groups are a substituted or unsubstituted aryl group having 6 to 30 carbon atoms. Examples of the aryl group include a phenyl group, a p-tolyl group, a naphthyl group, an m-chlorophenyl group, an o-hexadecanoyl aminophenyl group and the like. Examples of the substituent of the substituted aryl group include the substituents described for the substituted alkyl group.

The heterocyclic groups are a monovalent group obtained by removing one hydrogen atoms from a 5- or 6-membered substituted or unsubstituted, aromatic or nonaromatic heterocyclic compound, which may also be further condensed. A 5- or 6-membered aromatic heterocyclic group may have 3 to 30 carbon atoms. Examples of the substituent of the substituted heterocyclic group include the substituents described for the substituted alkyl group. Examples of the heterocyclic group include, with no limitation on substitution site, a pyridine group, a pyrazine group, a pyridazine group, a pyrimidine group, a triazine group, a quinoline group, an isoquinoline group, a quinazoline group, a cinnoline group, a phthalazine group, a quinoxaline group, a pyrrole group, an indole group, a furan group, a benzofuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzisothiazole group, a thiadiazole group, an isoxazole group, a benzisoxazole group, a pyrrolidine group, a piperidine group, a piperazine group, an imidazolidine group, a thiazoline group and the like.

The alkoxy groups include a substituted or unsubstituted alkoxy group. The substituted or unsubstituted alkoxy group may be an alkoxy group having 1 to 30 carbon atoms. Examples of the substituent of the substituted alkoxy group include the substituents described for the substituted alkyl group. Examples of the alkoxy group include a methoxy group, an ethoxy group, an isopropoxy group, an n-octyloxy group, a methoxyethoxy group, a hydroxyethoxy group, a 3-carboxy propoxy group and the like.

The aryloxy groups may be a substituted or unsubstituted aryloxy group having 6 to 30 carbon atoms. Examples of the substituent of the substituted aryloxy group include the substituents described for the substituted alkyl group. Examples of the aryloxy group include a phenoxy group, a 2-methyl phenoxy group, a 4-t-butyl phenoxy group, a 3-nitro phenoxy group, a 2-tetradecanoyl amino phenoxy group and the like.

The silyloxy groups may be a silyloxy group having 3 to 20 carbon atoms. Examples of the silyloxy group include a trimethyl silyloxy group, a t-butyldimethyl silyloxy group and the like.

The heterocyclic oxy groups may be a substituted or unsubstituted heterocyclic oxy group having 2 to 30 carbon atoms. Examples of the substituent of the substituted heterocyclic oxy group include the substituents described for the substituted alkyl group. Examples of the heterocyclic oxy group include a 1-phenyltetrazol-5-oxy group, a 2-tetrahydropyranyloxy group and the like.

The acyloxy groups may be a formyloxy group, a substituted or unsubstituted alkyl carbonyloxy group having 2 to 30 carbon atoms, or a substituted or unsubstituted aryl carbonyloxy group having 6 to 30 carbon atoms. Examples of the substituent of the substituted alkyl carbonyloxy group or the substituted aryl carbonyloxy group include substituents described for the substituted alkyl group. Examples of the acyloxy group include a formyloxy group, an acetyloxy group, a pivaloyloxy group, a stearoyloxy group, a benzoyloxy group, a p-methoxyphenyl carbonyloxy group and the like.

The carbamoyloxy groups may be a substituted or unsubstituted carbamoyloxy group having 1 to 30 carbon atoms. Examples of the substituent of the substituted carbamoyloxy group include the substituents described for the substituted alkyl group. Examples of the carbamoyloxy group include an N,N-dimethyl carbamoyloxy group, an N,N-diethyl carbamoyloxy group, a morpholino carbonyloxy group, an N,N-di-n-octyl amino carbonyloxy group, an N-n-octyl carbamoyloxy group and the like.

The alkoxy carbonyloxy groups may be a substituted or unsubstituted alkoxy carbonyloxy group having 2 to 30 carbon atoms. Examples of the substituent of the substituted alkoxy carbonyloxy group include the substituents described for the substituted alkyl group. Examples of the alkoxy carbonyloxy group include a methoxy carbonyloxy group, an ethoxy carbonyloxy group, a t-butoxy carbonyloxy group, an n-octyl carbonyloxy group and the like.

The aryloxy carbonyloxy groups may be a substituted or unsubstituted aryloxy carbonyloxy group having 7 to 30 carbon atoms. Examples of the substituent of the substituted aryloxy carbonyloxy group include the substituents described for the substituted alkyl group. Examples of the aryloxy carbonyloxy group include a phenoxy carbonyloxy group, a p-methoxyphenoxy carbonyloxy group, a p-n-hexadecyloxy phenoxy carbonyloxy group and the like.

The amino groups may be a substituted or unsubstituted alkylamino group having 1 to 30 carbon atoms, a substituted or unsubstituted arylamino group having 6 to 30 carbon atoms. Examples of the substituent of the substituted alkylamino group and the substituted arylamino group include the substituents described for the substituted alkyl group. Examples of the amino group include an amino group, a methylamino group, a dimethylamino group, an aniline group, an N-methyl-anilino group, a diphenyl amino group, a hydroxyethylamino group, a carboxyethylamino group, a sulfoethylamino group, a 3,5-dicarboxy aniline group and the like.

The acylamino groups may be a formyl amino group, a substituted or unsubstituted alkyl carbonyl amino group having 1 to 30 carbon atoms, or a substituted or unsubstituted aryl carbonyl amino group having 6 to 30 carbon atoms. Examples of the substituent of the substituted alkyl carbonyl amino group and the substituted aryl carbonyl amino group include the substituents described for the substituted alkyl group. Examples of the acylamino group include a formylamino group, an acetylamino group, a pivaloylamino group, a lauroylamino group, a benzoylamino group, a 3,4,5-tri-n-octyloxyphenyl carbonyl amino group and the like.

The amino carbonyl amino groups may be a substituted or unsubstituted amino carbonyl amino group having 1 to 30 carbon atoms. Examples of the substituent of the substituted amino carbonyl amino group include the substituents described for the substituted alkyl group. Examples of the amino carbonyl amino group include a carbamoylamino group, an N,N-dimethylamino carbonyl amino group, an N,N-diethylamino carbonyl amino group, a morpholino carbonyl amino group and the like.

The alkoxy carbonyl amino groups may be a substituted or unsubstituted alkoxy carbonyl amino group having 2 to 30 carbon atoms. Examples of the substituent of the substituted alkoxy carbonyl amino group include the substituents described for the substituted alkyl group. Examples of the alkoxy carbonyl amino group include a methoxy carbonyl amino group, an ethoxy carbonyl amino group, a t-butoxy carbonyl amino group, an n-octadecyloxy carbonyl amino group, an N-methyl-methoxy carbonyl amino group and the like.

The aryloxy carbonyl amino groups may be a substituted or unsubstituted aryloxy carbonyl amino group having 7 to 30 carbon atoms. Examples of the substituent of the substituted aryloxy carbonyl amino group include the substituents described for the substituted alkyl group. Examples of the aryloxy carbonyl amino group include a phenoxy carbonyl amino group, a p-chlorophenoxy carbonyl amino group, an m-n-octyloxy phenoxy carbonyl amino group and the like.

The sulfamoyl amino groups may be a substituted or unsubstituted sulfamoyl amino group having 0 to 30 carbon atoms. Examples of the substituent of the substituted sulfamoyl amino group include the substituents described for the substituted alkyl group. Examples of the sulfamoyl amino groups include a sulfamoyl amino group, an N,N-dimethylamino sulfonyl amino group, an N-n-octylamino sulfonylamino group and the like.

The alkyl sulfonyl amino groups may be a substituted or unsubstituted alkyl sulfonyl amino group having 1 to 30 carbon atoms. Examples of the substituent of the substituted alkyl sulfonyl amino group include the substituents described for the substituted alkyl group. Examples of the alkyl sulfonyl amino group include a methyl sulfonyl amino group, a butyl sulfonyl amino group and the like.

The aryl sulfonyl amino groups may be a substituted or unsubstituted aryl sulfonyl amino group having 6 to 30 carbon atoms. Examples of the substituent of the substituted aryl sulfonyl amino group include the substituents described for the substituted alkyl group. Examples of the aryl sulfonyl amino group include a phenyl sulfonyl amino group, a 2,3,5-trichlorophenyl sulfonyl amino group, a p-methyl phenyl sulfonyl amino group and the like.

The alkyl thio groups may be a substituted or unsubstituted alkyl thio group having 1 to 30 carbon atoms. Examples of the substituent of the substituted alkyl thio group include the substituents described for the substituted alkyl group. Examples of the alkyl thio group include a methyl thio group, an ethyl thio group, an n-hexadecyl thio group and the like.

The aryl thio groups may be a substituted or unsubstituted aryl thio group having 6 to 30 carbon atoms. Examples of the substituent of the substituted aryl thio group include the substituents described for the substituted alkyl group. Examples of the aryl thio groups include a phenyl thio group, a p-chlorophenyl thio group, an m-methoxyphenyl thio group and the like.

The heterocyclic thio groups may be a substituted or unsubstituted heterocyclic thio group having 2 to 30 carbon atoms. Examples of the substituent of the substituted heterocyclic thio group include the substituents described for the substituted alkyl group. Examples of the heterocyclic thio groups include a 2-benzothiazolyl thio group, a 1-phenyltetrazol-5-ylthio group and the like.

The sulfamoyl groups may be a substituted or unsubstituted sulfamoyl group having 0 to 30 carbon atoms. Examples of the substituent of the substituted sulfamoyl group include the substituents described for the substituted alkyl group. Examples of the sulfamoyl groups include an N-ethyl sulfamoyl group, an N-(3-dodecyloxy propyl)sulfamoyl group, an N,N-dimethyl sulfamoyl group, an N-acetyl sulfamoyl group, an N-benzoyl sulfamoyl group, an N—(N'-phenyl carbamoyl)sulfamoyl group and the like.

The alkyl sulfinyl groups may be a substituted or unsubstituted alkyl sulfinyl group having 1 to 30 carbon atoms. Examples of the substituent of the substituted alkyl sulfinyl group include the substituents described for the substituted alkyl group. Examples of the alkyl sulfinyl groups include a methyl sulfinyl group, an ethyl sulfinyl group and the like.

The aryl sulfinyl groups may be a substituted or unsubstituted aryl sulfinyl group having 6 to 30 carbon atoms. Examples of the substituent of the substituted aryl sulfinyl group include the substituents described for the substituted alkyl group. Examples of the aryl sulfinyl groups include a phenyl sulfinyl group, a p-methyl phenyl sulfinyl group and the like.

The alkyl sulfonyl groups may be a substituted or unsubstituted alkyl sulfonyl group having 1 to 30 carbon atoms. Examples of the substituent of the substituted alkyl sulfonyl group include the substituents described for the substituted alkyl group. Examples of the alkyl sulfonyl groups include a methyl sulfonyl group, an ethyl sulfonyl group and the like.

The aryl sulfonyl groups may be a substituted or unsubstituted aryl sulfonyl group having 6 to 30 carbon atoms. Examples of the substituent of the substituted aryl sulfonyl group include the substituents described for the substituted alkyl group. Examples of the aryl sulfonyl groups include a phenyl sulfonyl group, a p-toluene sulfonyl group and the like.

The acyl groups may be a formyl group, a substituted or unsubstituted alkyl carbonyl group having 2 to 30 carbon atoms, a substituted or unsubstituted aryl carbonyl group having 7 to 30 carbon atoms, a substituted or unsubstituted heterocyclic carbonyl group having 4 to 30 carbon atoms, bonded to a carbonyl group through a substituted or unsubstituted carbon atom. Examples of the substituent of the substituted alkyl carbonyl group, the substituted aryl carbonyl group, and the substituted heterocyclic carbonyl group include the substituents described for the substituted alkyl group. Examples of the acyl groups include an acetyl group, a pivaloyl group, a 2-chloroacetyl group, a stearoyl group, a benzoyl group, a p-n-octyloxy phenyl carbonyl group, a 2-pyridyl carbonyl group, a 2-furyl carbonyl group and the like.

The aryloxy carbonyl groups may be a substituted or unsubstituted aryloxy carbonyl group having 7 to 30 carbon atoms. Examples of the substituent of the substituted aryloxy carbonyl group include the substituents described for the substituted alkyl group. Examples of the aryloxy carbonyl group include a phenoxy carbonyl group, an o-chlorophenoxy carbonyl group, an m-nitrophenoxy carbonyl group, a p-t-butyl phenoxy carbonyl group and the like.

The alkoxy carbonyl groups may be a substituted or unsubstituted alkoxy carbonyl group having 2 to 30 carbon atoms. Examples of the substituent of the substituted alkoxy carbonyl group include the substituents described for the substituted alkyl group. Examples of the alkoxy carbonyl group include a methoxy carbonyl group, an ethoxy carbonyl group, a t-butoxy carbonyl group, an n-octadecyloxy carbonyl group and the like.

The carbamoyl groups may be a substituted or unsubstituted carbamoyl group having 1 to 30 carbon atoms. Examples of the substituent of the substituted carbamoyl group include the substituents described for the substituted alkyl group. Examples of the carbamoyl group include a carbamoyl group, an N-methyl carbamoyl group, an N,N-dimethyl carbamoyl group, an N,N-di-n-octyl carbamoyl group, an N-(methyl sulfonyl)carbamoyl group and the like.

The phosphino groups may be a substituted or unsubstituted phosphino group having 2 to 30 carbon atoms. Examples of the substituent of the substituted phosphino group include the substituents described for the substituted alkyl group. Examples of the phosphino group include a dimethyl phosphino group, a diphenyl phosphino group, a methyl phenoxy phosphino group and the like.

The phosphinyl groups may be a substituted or unsubstituted phosphinyl group having 2 to 30 carbon atoms. Examples of the substituent of the substituted phosphinyl group include the substituents described for the substituted alkyl group. Examples of the phosphinyl group include a phosphinyl group, a dioctyloxy phosphinyl group, a diethoxy phosphinyl group and the like.

The phosphinyloxy groups may be a substituted or unsubstituted phosphinyloxy group having 2 to 30 carbon atoms. Examples of the substituent of the substituted phosphinyloxy group include the substituents described for the substituted alkyl group. Examples of the phosphinyloxy group include a diphenoxy phosphinyloxy group, a dioctyloxy phosphinyloxy group and the like.

The phosphinyl amino groups may be a substituted or unsubstituted phosphinyl amino group having 2 to 30 carbon atoms. Examples of the substituent of the substituted phosphinyl amino group include the substituents described for the substituted alkyl group. Examples of the phosphinyl amino group include a dimethoxy phosphinyl amino group, a dimethylamino phosphinyl amino group and the like.

The silyl groups may be a substituted or unsubstituted silyl group having 3 to 30 carbon atoms. Examples of the substituent of the substituted silyl group include the substituents described for the substituted alkyl group. Examples of the silyl group include a trimethyl silyl group, a t-butyldimethyl silyl group, a phenyldimethyl silyl group and the like.

Examples of the azo groups include a phenyl azo group, a 4-methoxyphenyl azo group, a 4-pivaloylamino phenyl azo group, a 2-hydroxy-4-propanoyl phenyl azo group and the like.

Examples of the imido group include an N-succinimido group, an N-phthalimido group and the like.

In the general formula (1), $X_1$ and $X_2$, each independently, represents an electron attractive group, provided that $X_1$ and $X_2$ may be the same or different. Examples of $X_1$ and $X_2$ include an acyl group, an acyloxy group, a carbamoyl group, an alkyloxy carbonyl group, an aryloxy carbonyl group, a cyano group, a nitro group, a dialkyl phosphono group, a diaryl phosphono group, a diaryl phosphinyl group, an alkyl sulfinyl group, an aryl sulfinyl group, an alkyl sulfonyl group, an aryl sulfonyl group, a sulfonyloxy group, an acyl thio group, a sulfamoyl group, a thiocyanate group, a thiocarbonyl group, an alkyl halide group, an alkoxy halide group, an aryloxy halide group, an alkylamino halide group, an alkyl thio halide group, an aryl group substituted with another electron attractive group, a heterocyclic group, a halogen atom, an azo group, a selenocyanate group and the like.

Each of the $X_1$ and $X_2$ may be an acyl group having 2 to 12 carbon atoms, an acyloxy group having 2 to 12 carbon atoms, a carbamoyl group having 1 to 12 carbon atoms, an alkoxy carbonyl group having 2 to 12 carbon atoms, an aryloxy carbonyl group having 7 to 18 carbon atoms, a cyano group, a nitro group, an alkyl sulfinyl group having 1 to 12 carbon atoms, an aryl sulfinyl group having 6 to 18 carbon atoms, an alkyl sulfonyl group having 1 to 12 carbon atoms, an aryl sulfonyl group having 6 to 18 carbon atoms, a sulfamoyl group having 0 to 12 carbon atoms, an alkyl halide group having 1 to 12 carbon atoms, an alkoxy halide group having 1 to 12 carbon atoms, an alkyl thio halide group having 1 to 12 carbon atoms, an aryloxy halide group having 7 to 18 carbon atoms, an aryl group having 7 to 18 carbon atoms, substituted with two or more electron attractive group, and a heterocyclic group which has 1 to 18 carbon atoms, is 5- to 8-membered, and has a nitrogen atom, an oxygen atom, or a sulfur atom.

In the general formula (1), $Z_1$ and $Z_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that $Z_1$ and $Z_2$ may be the same or different. Examples of the alkyl group, the alkenyl group, the alkynyl group, the aralkyl group, the aryl group, and the heterocyclic group are same in the case of $R_1$, $R_2$, $Y_1$, and $Y_2$.

In the general formula (1), M represents a hydrogen atom, or a cation. The cation is an alkali metal ion, an ammonium ion, or a quaternary ammonium ion. The cation may be Li, Na, K, $NH_4$, or $NR_4$. R is an alkyl group, or an aryl group, and examples thereof are same in the case of $R_1$, $R_2$, $Y_1$, and $Y_2$. Out of these, preferred cation is Li, Na, K, or $NH_4$.

As for the combination of the preferred substituents of the dye represented by the general formula (1), preferred is a compound in which at least one of various substituents is the preferred group. More preferred is a compound in which a larger number of various substituents are the preferred groups. Most preferred is a compound in which all the substituents are the preferred substituents.

The particularly preferred combinations for the dye represented by the general formula (1) include the following (I) to (V).

(I) $R_1$ and $R_2$ may be the same or different, preferably a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. Out of these, preferred is a straight-chain alkyl group or branched alkyl group having 1 to 8 carbon atoms. Particularly, a secondary or tertiary alkyl group is preferred, and a t-butyl group is most preferred.

(II) $X_1$ and $X_2$, each independently, represents an electron attractive group, may be the same or different, preferably a cyano group, an alkyl sulfonyl group having 1 to 12 carbon atoms, an aryl sulfonyl group having 6 to 18 carbon atoms, or a sulfamoyl group having 0 to 12 carbon atoms. Out of these, a cyano group, or an alkyl sulfonyl group having 1 to 12 carbon atoms is preferred.

(III) $Y_1$ and $Y_2$ may be the same or different, preferably a hydrogen atom, a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. Out of these, a hydrogen atom, a substituted or unsubstituted alkyl group is preferred. A hydrogen atom is most preferred.

(IV) $Z_1$ and $Z_2$ may be the same or different, preferably a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. The particularly preferred substituent is a substituted or unsubstituted aryl group or a substituted or unsubstituted heterocyclic group. Out of these, particularly, a substituted aryl group is preferred.

(V) M is preferably a hydrogen atom, an alkali metal ion, an ammonium ion, or a quaternary ammonium ion. Out of these, a hydrogen atom, Li, Na, K, or $NH_4$ is preferred.

Examples of the dye represented by the general formula (1) comprise compounds represented by the following chemical formulae (1-A) to (1-E). In the following chemical formulae (1-A) to (1-E), $C_4H_9(t)$ represents a t-butyl group.

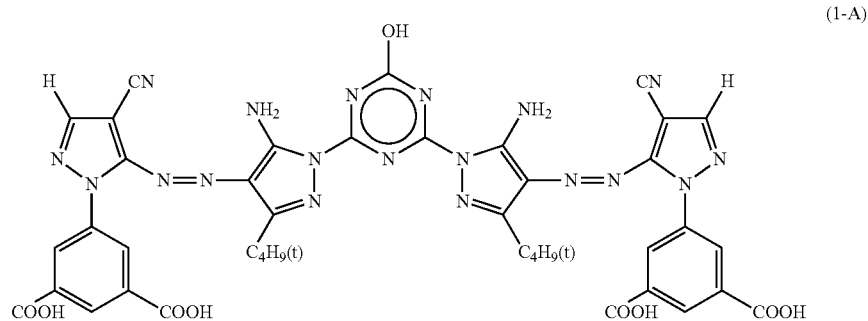

(1-A)

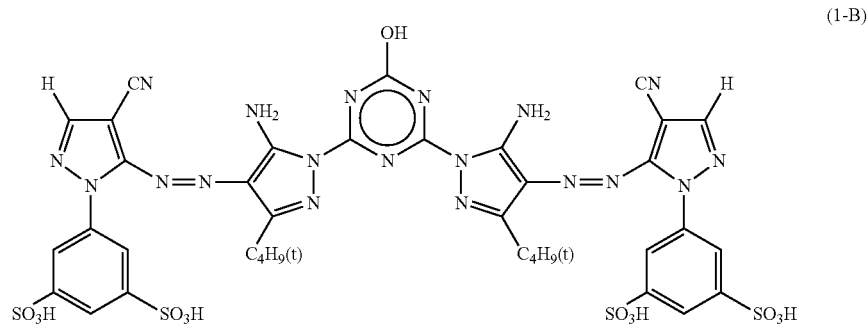

(1-B)

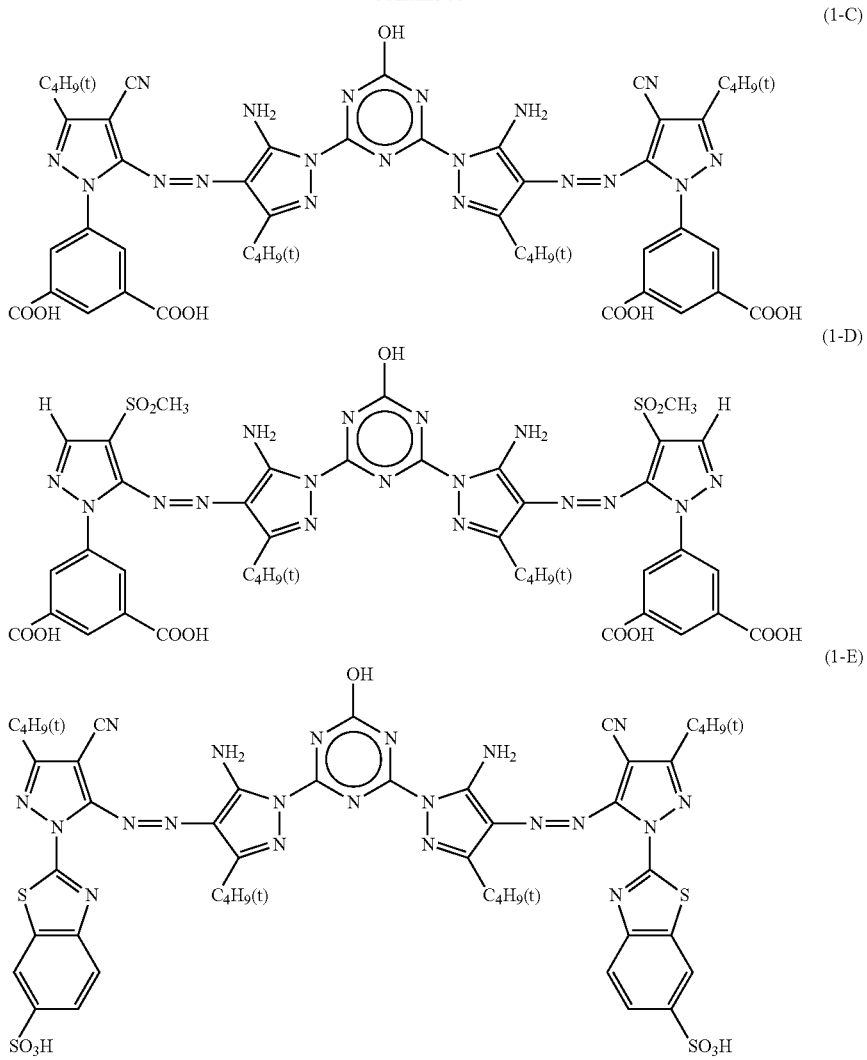

An amount of the dye represented by the general formula (1) is not particularly limited. Inclusion of the dye represented by the general formula (1) in the first water-based ink makes it possible to improve toughness such as light resistance and ozone resistance of a recording material recorded using the first water-based ink. As described above, the amount of the dye represented by the general formula (1) may exceed 0 wt % and is equal to or less than about 7 wt % relative to the total amount of the first water-based ink. Setting the amount of the dye represented by the general formula (1) in the aforementioned range makes it possible to obtain a water-based ink good in printing quality and ejection stability. The amount of the dye represented by the general formula (1) is, for example, in the range of about 0.2 wt % to about 5 wt %, and in the range of about 1 wt % to about 5 wt %.

The coloring agent may be composed of the dye represented by the general formula (1) only or may further comprise other dyes and pigments.

The water may be ion-exchange water or purified water. An amount of the water relative to the total amount of the first water-based ink is, for example, in the range of about 10 wt % to about 90 wt %, and in the range of about 40 wt % to about 80 wt %. The amount of the water may be a balance of the other components, for example.

As described above, in the first water-based ink, an amount of glycerin is set so as to satisfy the following condition (A).

$$3.5X-5 \leq Y1 \leq 3.5X \quad (A)$$

X: an amount of a dye represented by general formula (1) relative to a total amount of the ink (wt %)

Y1: an amount of glycerin relative to a total amount of the ink (wt %)

Inclusion of glycerin in an amount satisfying $Y1 \leq 3.5X$ makes it possible to obtain a water-based ink good in preservation stability. Further, because an amount of the glycerin is set so as to satisfy $Y1 \geq 3.5X-5$, a water-based ink that is good in ejection stability may be obtained.

The X and Y1 may strictly satisfy the condition (A) or may be placed at neighborhood of the straight line of $Y1=3.5X-5$ in $Y1<3.5X-5$ and the straight line of $Y1=3.5X$ in $Y1>3.5X$.

As described above, in the first water-based ink, in a case of $X>5/3.5$, glycerin may be comprised in the first water-based ink for ink-jet recording in an amount satisfying the condition (A), and in a case of $X \leq 5/3.5$, glycerin may be comprised in the first water-based ink in an amount satisfying the following condition (B).

$$0<Y1 \leq 3.5X \quad (B)$$

X: an amount of a dye represented by general formula (1) relative to a total amount of the ink (wt %)

Y1: an amount of glycerin relative to a total amount of the ink (wt %)

In the case of $X \leq 5/3.5$, the X and Y1 may strictly satisfy the condition (B) or may be placed at neighborhood of the straight line of Y1=3.5X in Y1>3.5X.

As described above, with respect to the first water-based ink, in a case of $X \leq 5/3.5$, glycerin may not be comprised in the first water-based ink. In this manner, in a case where the amount of the dye represented by the general formula (1) is small, a water-based ink may be obtained that is good in ejection stability and hardly generates the aggregation even when glycerin is not comprised.

The first water-based ink may further comprised water-soluble organic solvents other than glycerin. However, an amount of the water-soluble organic solvents should be in a range that does not undermine the advantage of the present invention. The water-soluble organic solvent is classified into a humectant and a penetrant. The humectant prevents ink from drying at a tip of an ink-jet head, for example. The penetrant adjusts a drying rate of ink on a recording paper, for example.

The humectant is not limited. Examples of the humectant include lower alcohol such as methyl alcohol, ethyl alcohol, n-propyl alcohol, isopropyl alcohol, n-butyl alcohol, sec-butyl alcohol, t-butyl alcohol and the like; amide such as dimethylformamide, dimethylacetamide and the like; ketone such as acetone and the like; ketoalcohol such as diacetone alcohol and the like; ether such as tetrahydrofuran, dioxane and the like; polyalcohol such as polyalkylene glycol, alkylene glycol and the like; 2-pyrrolidone; N-methyl-2-pyrrolidone; 1,3-dimethyl-2-imidazolidinone; and the like. Examples of the polyalkylene glycol include, without limitation, polyethylene glycol, polypropylene glycol and the like. Examples of the alkylene glycol include, without limitation, ethylene glycol, propylene glycol, butylene glycol, diethylene glycol, triethylene glycol, dipropylene glycol, tripropylene glycol, thiodiglycol, hexylene glycol and the like. Among them, polyalcohol such as alkylene glycol is preferable. One of the humectants may be used alone or two or more of them may be used in combination.

An amount of the humectant is not particularly limited. The amount of the humectant relative to the total amount of the first water-based ink is, for example, in the range of about 0 wt % to about 95 wt %, in the range of about 10 wt % to about 80 wt %, and in the range of about 10 wt % to about 50 wt %.

The penetrant is not limited. Examples of the penetrant include glycol ether. Examples of the glycol ether include ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, tripropylene glycol propyl ether, tripropylene glycol butyl ether and the like. One of the penetrants may be used alone or two or more of them may be used in combination.

An amount of the penetrant is, for example, in the range of about 0 wt % to about 20 wt %. Setting of the amount of the penetrant in the aforementioned range makes it possible to obtain suitable penetration of the first water-based ink relative to a paper. The amount of the penetrant may be in the range of about 0.1 wt % to about 15 wt %, and in the range of about 0.5 wt % to about 10 wt %.

The first water-based ink may further comprise conventionally known additives as required. Examples of the additive include a surfactant, a viscosity modifier, a surface tension modifier, and an antifungal agent. Examples of the viscosity modifier include, without limitation, polyvinyl alcohol, cellulose, water-soluble resin and the like.

The first water-based ink may be prepared, for example, by uniformly mixing the coloring agent, water, the water-soluble organic solvent with other added components as required by a conventionally known method, and then removing insolubles with a filter or the like.

The first water-based ink may be used as a water-based yellow ink, for example. The first water-based ink may be a water-based ink other than a yellow color by further comprising coloring agents other than the dye represented by the general formula (1).

Next, the second water-based ink for ink-jet recording (hereinafter, also may simply be referred to as "second water-based ink" or "second ink") is explained. The second water-based ink comprises a coloring agent and water. As described above, the coloring agent comprises the dye represented by the general formula (1).

Examples of the dye represented by the general formula (1) are same as that of the first water-based ink for ink-jet recording.

An amount of the dye represented by the general formula (1) is not particularly limited. Inclusion of the dye represented by the general formula (1) in the second water-based ink makes it possible to improve toughness such as light resistance and ozone resistance of a recording material recorded using the second water-based ink. As described above, the amount of the dye represented by the general formula (1) may exceed 0 wt % and is equal to or less than about 6 wt % relative to the total amount of the second water-based ink. Setting the amount of the dye represented by the general formula (1) in the aforementioned range makes it possible to obtain a water-based ink good in printing quality and ejection stability. The amount of the dye represented by the general formula (1) is, for example, in the range of about 0.2 wt % to about 5 wt %, and in the range of about 1.5 wt % to about 5 wt %.

The coloring agent may be composed of the dye represented by the general formula (1) only or may further comprise other dyes and pigments.

The water and the amount thereof are same as that of the first water-based ink described above.

As described above, in the second water-based ink, an amount of ethylene glycol is set so as to satisfy the following condition (D).

$$3.5X-5 \leq Y2 \leq X+10 \quad (D)$$

X: an amount of a dye represented by general formula (1) relative to a total amount of the ink (wt %)

Y2: an amount of ethylene glycol relative to a total amount of the ink (wt %)

Inclusion of ethylene glycol in an amount satisfying $Y2 \leq X+10$ makes it possible to obtain a water-based ink good in preservation stability. Further, because an amount of the ethylene glycol is set so as to satisfy $Y2 \geq 3.5X-5$, a water-based ink that is good in ejection stability may be obtained.

The X and Y2 may strictly satisfy the condition (D) or may be placed at neighborhood of the straight line of Y2=3.5X−5 in Y2<3.5X−5 and the straight line of Y2=X+10 in Y2>X+10.

As described above, in the second water-based ink, in a case of X>5/3.5, ethylene glycol may be comprised in the second water-based ink in an amount satisfying the condition (D), and in a case of X≦5/3.5, ethylene glycol may be comprised in the second water-based ink in an amount satisfying the following condition (E).

$$0 < Y2 \leq X+10 \quad (E)$$

X: an amount of a dye represented by general formula (1) relative to a total amount of the ink (wt %)

Y2: an amount of ethylene glycol relative to a total amount of the ink (wt %)

In the case of X≦5/3.5, the X and Y2 may strictly satisfy the condition (E) or may be placed at neighborhood of the straight line of Y2=X+10 in Y2>X+10.

As described above, with respect to the second water-based ink, in a case of X≦5/3.5, ethylene glycol may not be comprised in the second water-based ink. In this manner, in a case where the amount of the dye represented by the general formula (1) is small, a water-based ink may be obtained that is good in ejection stability and hardly generates the aggregation even when ethylene glycol is not comprised.

The second water-based ink may comprise water-soluble organic solvents other than ethylene glycol. Examples of the water-soluble organic solvents other than ethylene glycol are same as the water-soluble organic solvents other than glycerin in the first water-based ink except that the glycerin is added to the humectant and ethylene glycol is excluded from the penetrant. An amount of the water-soluble organic solvents are same as the water-soluble organic solvents in the first water-based ink.

The second water-based ink may further comprise conventionally known additives as required. Examples of the additive are same as the additive in the first water-based ink.

The second water-based ink may be prepared, for example, by uniformly mixing the coloring agent, water, the water-soluble organic solvent with other added components as required by a conventionally known method, and then removing insolubles with a filter or the like.

The second water-based ink may be used as a water-based yellow ink, for example. The second water-based ink may be a water-based ink other than a yellow color by further comprising coloring agents other than the dye represented by the general formula (1).

An ink cartridge comprises the first water-based ink or the second water-based ink. As a body of the ink cartridge, for example, a conventionally known body may be used.

Next, an ink-jet recording apparatus is explained. The ink-jet recording apparatus comprises the ink cartridge and an ink ejection unit, and the water-based ink comprised in the ink cartridge is ejected from the ink ejection unit. Other than this, the ink-jet recording apparatus may have the construction similar to that of a conventionally known ink-jet recording apparatus.

FIG. 1 shows a construction of an example of the ink-jet recording apparatus. As shown in FIG. 1, the ink-jet recording apparatus 1 comprises four ink cartridges 2, an ink-jet head 3, a head unit 4, a carriage 5, a drive unit 6, a platen roller 7, and a purge unit 8 as main constructional elements. In the ink-jet recording apparatus 1 of this example, the ink-jet head 3 is the ink ejection unit.

The four ink cartridges 2 each comprise water-based inks of yellow, magenta, cyan, and black. For example, the water-based yellow ink is the first water-based ink or the second water-based ink. The ink-jet head 3 performs printing on a recording material P such as a recording paper. The head unit 4 is provided with the ink-jet head 3. The four ink cartridges 2 and the head unit 4 are mounted to the carriage 5. The drive unit 6 reciprocates the carriage 5 in a straight line. The platen roller 7 extends in a reciprocating direction of the carriage 5 and opposes to the ink-jet head 3.

The drive unit 6 comprises a carriage shaft 9, a guide plate 10, a pair of pulleys 11 and 12, and an endless belt 13. The carriage shaft 9 is disposed at a lower end portion of the carriage 5 and extends in parallel to the platen roller 7. The guide plate 10 is disposed at an upper end portion of the carriage 5 and extends in parallel to the carriage shaft 9. The pulleys 11 and 12 are disposed in positions corresponding to both end portions of the carriage shaft 9 and between the carriage shaft 9 and the guide plate 10. The endless belt 13 is stretched between the pulleys 11 and 12.

In the ink-jet recording apparatus 1, as the pulley 11 is rotated in normal and reverse directions by the drive of a carriage motor 101, the carriage 5 which is connected to the endless belt 13 is reciprocated linearly along the carriage shaft 9 and the guide plate 10 in accordance with the rotation of the pulley 11.

The recording material P is fed from a paper feeding cassette (not shown) positioned on a side of or underneath the ink-jet recording apparatus 1. The recording material P is introduced between the ink-jet head 3 and the platen roller 7. Then, a predetermined printing is performed on the recording material P with the ink ejected from the ink-jet head 3. The recording material P then is discharged from the ink-jet recording apparatus 1. In FIG. 1, a feeding mechanism and a discharging mechanism of the recording material P are not shown.

The purge unit 8 is provided on a side of the platen roller 7. The purge unit 8 is disposed so as to oppose the ink-jet head 3 when the head unit 4 is in a reset position (above the purge unit 8 in this example). The purge unit 8 comprises a purge cap 14, a pump 15, a cam 16, and an ink reservoir 17. The purge cap 14 covers a plurality of nozzles (not shown) of the ink-jet head 3 when the head unit 4 is in a reset position. In this state, the pump 15 draws poor ink comprising, for example, air bubbles trapped inside the ink-jet head 3, by being driven by the cam 16. Thereby a recovery of the ink-jet head 3 is promoted. The drawn poor ink is stored in the ink reservoir 17.

A wiper member 20 is provided on the side of platen roller 7 in the purge unit 8. The wiper member 20 has a spatula shape, and wipes a nozzle surface of the ink-jet head 3 in accordance with the movement of the carriage 5. In order to prevent the ink from drying, the cap 18 covers the plurality of nozzles of the ink-jet head 3 that returns to the reset position after the completion of printing.

With respect to the ink-jet recording apparatus 1 of this example, the four ink cartridges 2 are mounted to one carriage 5. However, the present invention is not limited thereto. With respect to the ink-jet recording apparatus of the present invention, the four ink cartridges may be mounted to a plurality of carriages. Further, the four ink cartridges may not be mounted to the carriage, but may be provided and fixed in the ink-jet recording apparatus. In this state, for example, the ink cartridge and the head unit mounted to the carriage are connected via a tube, or the like, and the ink is supplied to the head unit from the ink cartridge.

Next, a method of stabilizing a first water-based ink for ink-jet recording is explained. The water-based ink comprises a coloring agent and water. The coloring agent comprises a dye represented by the general formula (1). The ink is stabilized by setting an amount of glycerin so as to satisfy the condition (A) in the ink. The method of stabilizing the first water-based ink for ink-jet recording may suitably be applied to stabilization of the first water-based ink for ink-jet recording.

With respect to the method of stabilizing the first water-based ink for ink-jet recording, in a case of X>5/3.5, glycerin may be comprised in the ink in an amount satisfying the condition (A), and in a case of X≦5/3.5, glycerin may be comprised in the ink in an amount satisfying the condition (B).

With respect to the method of stabilizing the first water-based ink for ink-jet recording, in a case of X≦5/3.5, glycerin may not be comprised in the ink. In this manner, in a case where an amount of the dye is small, the ink is stabilized even when glycerin is not comprised.

The method of stabilizing the first water-based ink for ink-jet recording further may satisfy the condition (C).

Next, a method of stabilizing a second water-based ink for ink-jet recording is explained. The water-based ink comprises a coloring agent and water. The coloring agent comprises a dye represented by the general formula (1). The ink is stabilized by setting an amount of ethylene glycol so as to satisfy the condition (D) in the ink. The method of stabilizing the second water-based ink for ink-jet recording may suitably be applied to stabilization of the second water-based ink for ink-jet recording.

With respect to the method of stabilizing the second water-based ink for ink-jet recording, in a case of X>5/3.5, ethylene glycol may be comprised in the ink in an amount satisfying the condition (D), and in a case of X≦5/3.5, ethylene glycol may be comprised in the ink in an amount ratio satisfying the condition (E).

With respect to the method of stabilizing the second water-based ink for ink-jet recording, in a case of X≦5/3.5, ethylene glycol may not be comprised in the ink. In this manner, in a case where an amount of a dye represented by the general formula (1) is small, the ink is stabilized even when ethylene glycol is not comprised.

The method of stabilizing the second water-based ink for ink-jet recording further may satisfy the condition (F).

With respect to the method of stabilizing the first and second water-based ink for ink-jet recording, a dye represented by the general formula (1) may comprise at least one compound selected from the group consisting of compounds represented by the chemical formulae (1-A) to (1-E).

EXAMPLES

Examples of the present invention are described together with Comparative Examples, which are provided for illustrative purposes only. The present invention is not limited by the following Examples and Comparative Examples.

Examples 1 to 18 and Comparative Examples 1 to 19

An ink composition (Tables 1 to 9) was stirred and then mixed. Thereafter, the mixture was filtered with a hydrophilic polytetrafluoroethylene (PTFE) type membrane filter having a pore diameter of 0.2 μm manufactured by ToyoRoshi Kaisha, Ltd. to produce each water-based ink and thereby obtained the water-based ink of Examples 1 to 18 and Comparative Examples 1 to 19. In the following Tables 1 to 9, the dyes (1-A) to (1-E), are compounds respectively represented by the chemical formulae (1-A) to (1-E).

With respect to the water-based ink of each Example and Comparative Example, (a) aggregation evaluation, (b) preservation stability evaluation, and (c) comprehensive evaluation were carried out with the following method.

(a) Aggregation Evaluation

Figure 2:
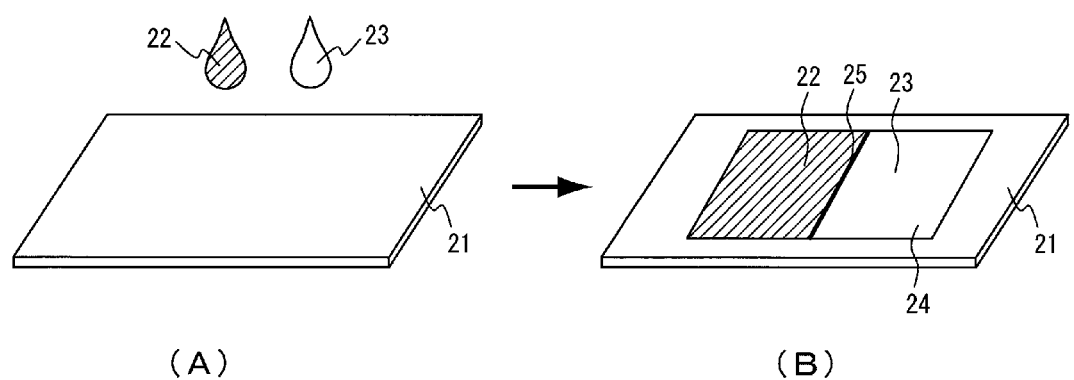
FIG. 2 is a view for explaining a method of an aggregation evaluation in Examples of the present invention.

First, as shown in FIG. 2(A), a water-based ink 22 of a black ink cartridge LC10BK manufactured by Brother Industries, Ltd. and a water-based ink 23 of each Example and Comparative Example were respectively dropped on a glass slide 21 by 3 μL. Next, as shown in FIG. 2 (B), both water-based inks were brought into contact by covering the dropped water-based inks with a cover glass 24. An interface 25 of the both water-based inks in a prepared slide that is made in the aforementioned manner was observed with a microscope and evaluated according to the following Evaluation Criteria. The marked presence of the aggregation substance causes an unstable ejection such as unejection, random ejection, or the like, at the time of ink eject from an ink-jet nozzle. Therefore, if the result of this aggregation evaluation is good, it can be judged that a water-based ink is good in ejection stability.

Aggregation Evaluation Criteria

G: granulated aggregation substance was found on interface 25 of the both water-based inks but wall-like aggregation that is formed by succession of aggregation substances was not found NG: wall-like aggregation that is formed by succession of aggregation substances was found on interface 25 of the both water-based inks (b) Preservation Stability Evaluation The water-based ink of each Example and Comparative Example was diluted with purified water by 1600 times. Absorption of the dilution at wavelength of 440 nm was measured using an ultraviolet-visible-near-infrared spectrophotometer, UV3600, manufactured by Shimadzu Corporation. The measurement was carried out using a measurement cell with a length of 10 mm. Subsequently, the water-based ink was contained in a sealed container and stored for a week under an environment of 70° C., separately. Next, the water-based ink after storage was diluted with purified water by 1600 times and absorption of the dilution was measured in the same manner as the water-based ink before storage. Then, an absorption reduction rate (%) was obtained with the following formula (I) and preservation stability was evaluated according to the following Evaluation Criteria. When the absorption reduction rate is low, degradation of the dye is inhibited, and it can be said that the water-based ink is good in preservation stability.

$$\text{Absorption reduction rate}(\%)=((X-Y)/X)\times 100 \quad (I)$$

X: Absorption before storage
Y: Absorption after storage
Preservation Stability Evaluation Criteria
G: absorption reduction rate is less than 5%
NG: absorption reduction rate is 5% or more (c) Comprehensive Evaluation With respect to the water-based ink of each Example and Comparative Example, from the results of (a) and (b), the comprehensive evaluation was carried out according to the following Evaluation Criteria.

Figure 3:
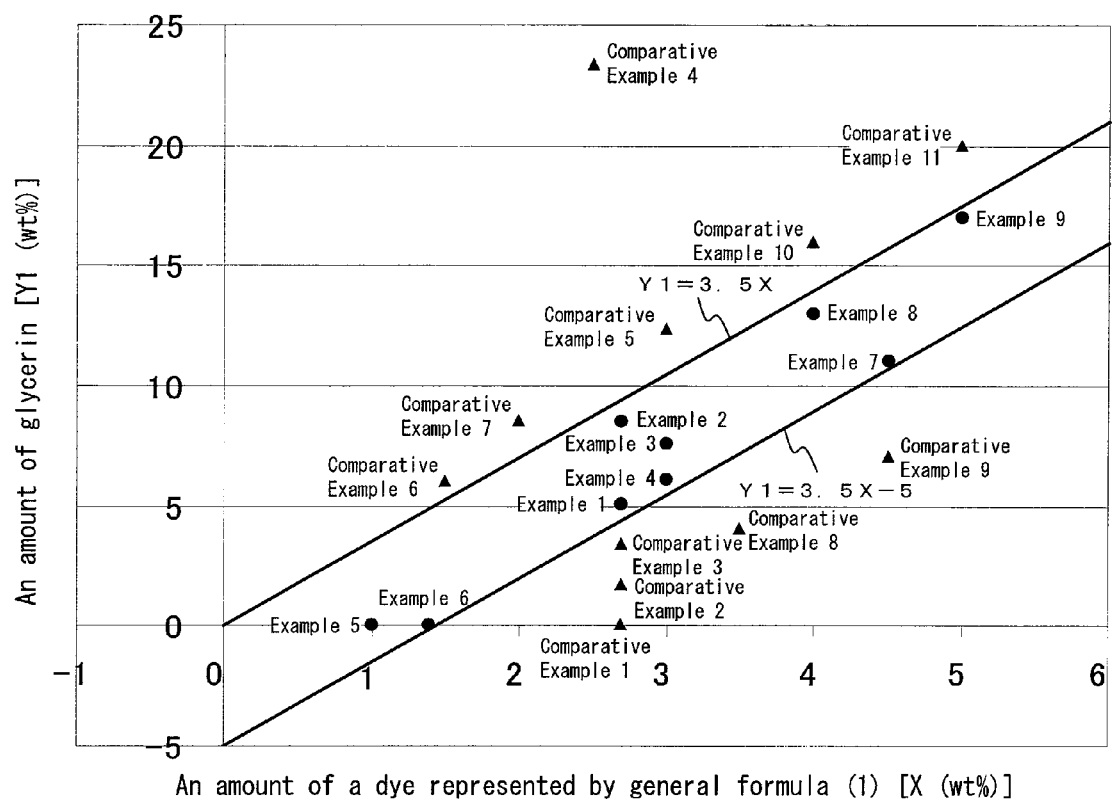
FIG. 3 is a graph indicating a relationship between an amount of a dye represented general formula (1) [X (wt %)] and an amount of glycerin [Y1 (wt %)] relative to the total amount of ink in Examples 1 to 9 and Comparative Examples 1 to 11.
Figure 4:
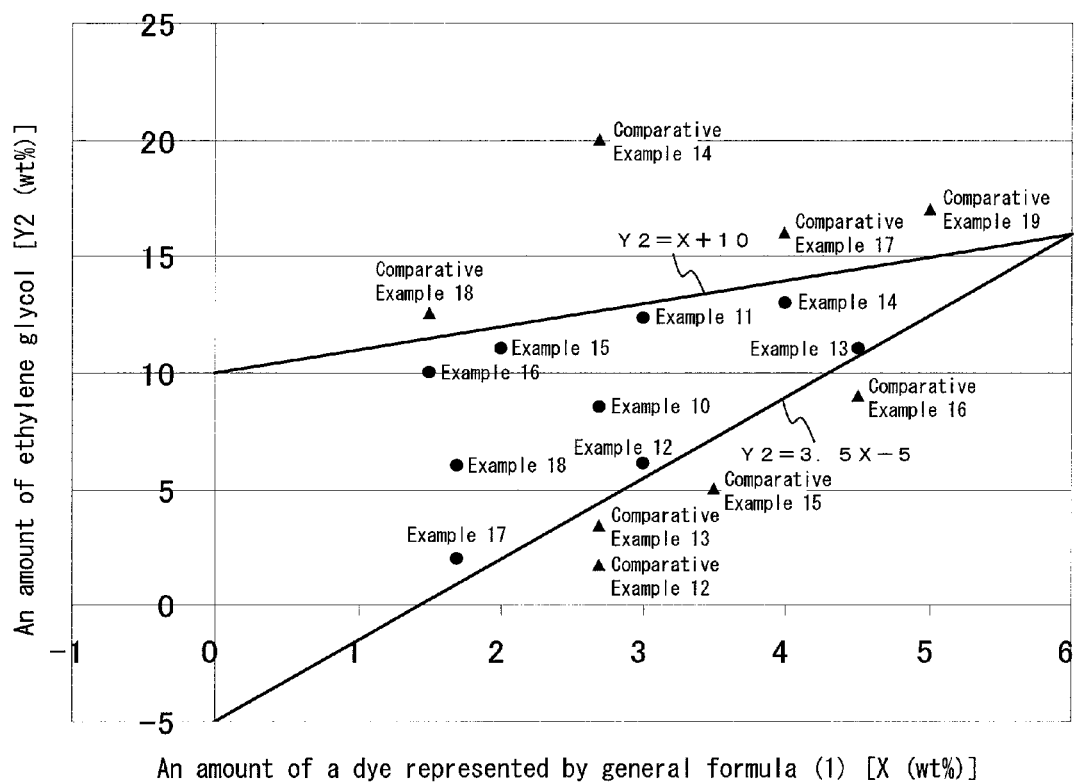
FIG. 4 is a graph indicating a relationship between an amount of a dye represented general formula (1) [X (wt %)] and an amount of ethylene glycol [Y2 (wt %)] relative to the total amount of ink in Examples 10 to 18 and Comparative Examples 12 to 19.

Comprehensive Evaluation Criteria
G: all evaluation results were "G"
NG: "NG" was found in one or more of the evaluation results Ink compositions and evaluation results of the water-based ink of each Example are summarized in Tables 1 to 4. Further, ink compositions and evaluation results of the water-based ink of each Comparative Example are summarized in Tables 5 to 9. A relationship between an amount of the dye represented by the general formula (1) [X (wt %)] and an amount of glycerin [Y1 (wt %)] relative to the total amount of ink in Examples 1 to 9 and Comparative Examples 1 to 11 is shown in FIG. 3. A relationship between an amount of the dye represented by the general formula (1) [X (wt %)] and an amount of ethylene glycol [Y2 (wt %)] relative to the total amount of ink in Examples 10 to 18 and Comparative Examples 12 to 19 is shown in FIG. 4.

TABLE 1

|  | Example 1 | Example 2 | Example 3 | Example 4 | Example 5 |
|---|---|---|---|---|---|
| INK COMPOSITION (wt %) dye (X) | | | | | |
| dye(1-A) | 2.7 | — | — | — | — |
| dye(1-B) | — | 2.7 | — | — | — |
| dye(1-C) | — | — | 3.0 | — | — |
| dye(1-D) | — | — | — | 3.0 | — |
| dye(1-E) | — | — | — | — | 1.0 |
| Glycerin (Y1) | 5.1 | 8.5 | 7.6 | 6.1 | — |
| Triethylene glycol-n-butyl ether | 3.0 | 3.0 | 3.0 | 3.0 | 3.0 |
| Polyethylene glycol 200 | 14.9 | 11.5 | 12.4 | 13.9 | 20.0 |
| Water | Balance | Balance | Balance | Balance | Balance |
| EVALUATION | | | | | |
| Aggregation Evaluation | G | G | G | G | G |
| Preservation Stability Evaluation | G | G | G | G | G |
| Absorption reduction rate | 3.2% | 3.5% | 2.9% | 2.0% | 0.8% |
| Comprehensive Evaluation | G | G | G | G | G |

TABLE 2

|  | Example 6 | Example 7 | Example 8 | Example 9 |
|---|---|---|---|---|
| INK COMPOSITION (wt %) dye (X) | | | | |
| dye(1-A) | 1.4 | — | — | — |
| dye(1-B) | — | 4.5 | — | — |
| dye(1-C) | — | — | 4.0 | — |
| dye(1-D) | — | — | — | 5.0 |
| Glycerin (Y1) | — | 11.0 | 13.0 | 17.0 |
| Triethylene glycol-n-butyl ether | 3.0 | 3.0 | 3.0 | 3.0 |
| Polyethylene glycol 200 | 20.0 | 9.0 | 7.0 | 3.0 |
| Water | Balance | Balance | Balance | Balance |
| EVALUATION | | | | |
| Aggregation Evaluation | G | G | G | G |
| Preservation Stability Evaluation | G | G | G | G |
| Absorption reduction rate | 1.2% | 4.0% | 4.5% | 4.6% |
| Comprehensive Evaluation | G | G | G | G |

TABLE 3

|  | Example 10 | Example 11 | Example 12 | Example 13 | Example 14 |
|---|---|---|---|---|---|
| INK COMPOSITION (wt %) dye (X) | | | | | |
| dye(1-A) | 2.7 | — | — | — | — |
| dye(1-B) | — | 3.0 | — | — | — |
| dye(1-C) | — | — | 3.0 | — | — |
| dye(1-D) | — | — | — | 4.5 | — |
| dye(1-E) | — | — | — | — | 4.0 |
| Ethylene glycol (Y2) | 8.5 | 12.3 | 6.1 | 11.0 | 13.0 |
| Triethylene glycol-n-butyl ether | 3.0 | 3.0 | 3.0 | 3.0 | 3.0 |
| Polyethylene glycol 200 | 11.5 | 7.7 | 13.9 | 9.0 | 7.0 |
| Water | Balance | Balance | Balance | Balance | Balance |
| EVALUATION | | | | | |
| Aggregation Evaluation | G | G | G | G | G |
| Preservation Stability Evaluation | G | G | G | G | G |
| Absorption reduction rate | 3.8% | 4.5% | 2.0% | 3.0% | 4.8% |
| Comprehensive Evaluation | G | G | G | G | G |

TABLE 4

|  | Example 15 | Example 16 | Example 17 | Example 18 |
|---|---|---|---|---|
| INK COMPOSITION (wt %) dye (X) | | | | |
| dye(1-A) | 2.0 | — | — | — |
| dye(1-B) | — | 1.5 | — | — |
| dye(1-C) | — | — | 1.7 | — |
| dye(1-D) | — | — | — | 1.7 |
| Ethylene glycol (Y2) | 11.0 | 10.0 | 2.0 | 6.0 |
| Triethylene glycol-n-butyl ether | 3.0 | 3.0 | 3.0 | 3.0 |
| Polyethylene glycol 200 | 9.0 | 10.0 | 18.0 | 14.0 |
| Water | Balance | Balance | Balance | Balance |
| EVALUATION | | | | |
| Aggregation Evaluation | G | G | G | G |
| Preservation Stability Evaluation | G | G | G | G |
| Absorption reduction rate | 3.4% | 3.9% | 3.9% | 3.3% |
| Comprehensive Evaluation | G | G | G | G |

TABLE 5

|  | Comparative Example 1 | Comparative Example 2 | Comparative Example 3 | Comparative Example 4 |
| --- | --- | --- | --- | --- |
| INK COMPOSITION (wt %) dye (X) | | | | |
| dye(1-A) | 2.7 | — | — | — |
| dye(1-B) | — | 2.7 | — | — |
| dye(1-C) | — | — | 2.7 | — |
| dye(1-D) | — | — | — | 2.5 |
| Glycerin (Y1) | — | 1.7 | 3.4 | 23.3 |
| Triethylene glycol-n-butyl ether | 3.0 | 3.0 | 3.0 | 3.0 |
| Polyethylene glycol 200 | 20.0 | 18.3 | 16.6 | — |
| Water | Balance | Balance | Balance | Balance |
| EVALUATION | | | | |
| Aggregation Evaluation | NG | NG | NG | G |
| Preservation Stability Evaluation | G | G | G | NG |
| Absorption reduction rate | 1.0% | 3.4% | 2.9% | 5.6% |
| Comprehensive Evaluation | NG | NG | NG | NG |

TABLE 6

|  | Comparative Example 5 | Comparative Example 6 | Comparative Example 7 | Comparative Example 8 |
| --- | --- | --- | --- | --- |
| INK COMPOSITION (wt %) dye (X) | | | | |
| dye(1-A) | — | 1.5 | — | — |
| dye(1-B) | — | — | 2.0 | — |
| dye(1-C) | — | — | — | 3.5 |
| dye(1-E) | 3.0 | — | — | — |
| Glycerin (Y1) | 12.3 | 6.0 | 8.5 | 4.0 |
| Triethylene glycol-n-butyl ether | 3.0 | 3.0 | 3.0 | 3.0 |
| Polyethylene glycol 200 | 7.7 | 14.0 | 11.5 | 16.0 |
| Water | Balance | Balance | Balance | Balance |
| EVALUATION | | | | |
| Aggregation Evaluation | G | G | G | NG |
| Preservation Stability Evaluation | NG | NG | NG | G |
| Absorption reduction rate | 5.3% | 5.4% | 5.3% | 3.0% |
| Comprehensive Evaluation | NG | NG | NG | NG |

TABLE 7

|  | Comparative Example 9 | Comparative Example 10 | Comparative Example 11 |
| --- | --- | --- | --- |
| INK COMPOSITION (wt %) dye (X) | | | |
| dye(1-D) | 4.5 | — | — |
| dye(1-E) | — | 4.0 | 5.0 |
| Glycerin (Y1) | 7.0 | 16.0 | 20.0 |
| Triethylene glycol-n-butyl ether | 3.0 | 3.0 | 3.0 |
| Polyethylene glycol 200 | 13.0 | 4.0 | — |
| Water | Balance | Balance | Balance |
| EVALUATION | | | |
| Aggregation Evaluation | NG | G | G |
| Preservation Stability Evaluation | G | NG | NG |
| Absorption reduction rate | 3.6% | 6.0% | 6.2% |
| Comprehensive Evaluation | NG | NG | NG |

TABLE 8

|  | Comparative Example 12 | Comparative Example 13 | Comparative Example 14 | Comparative Example 15 |
| --- | --- | --- | --- | --- |
| INK COMPOSITION (wt %) dye (X) | | | | |
| dye(1-A) | 2.7 | — | — | — |
| dye(1-B) | — | 2.7 | — | — |
| dye(1-C) | — | — | 2.7 | — |
| dye(1-D) | — | — | — | 3.5 |
| Ethylene glycol (Y2) | 1.7 | 3.4 | 20.0 | 5.0 |
| Triethylene glycol-n-butyl ether | 3.0 | 3.0 | 3.0 | 3.0 |
| Polyethylene glycol 200 | 18.3 | 16.6 | — | 15.0 |
| Water | Balance | Balance | Balance | Balance |
| EVALUATION | | | | |
| Aggregation Evaluation | NG | NG | G | NG |
| Preservation Stability Evaluation | G | G | NG | G |
| Absorption reduction rate | 3.4% | 1.8% | 5.7% | 3.0% |
| Comprehensive Evaluation | NG | NG | NG | NG |

TABLE 9

|  | Comparative Example 16 | Comparative Example 17 | Comparative Example 18 | Comparative Example 19 |
| --- | --- | --- | --- | --- |
| INK COMPOSITION (wt %) dye (X) | | | | |
| dye(1-A) | — | 4.0 | — | — |
| dye(1-B) | — | — | 1.5 | — |
| dye(1-C) | — | — | — | 5.0 |
| dye(1-E) | 4.5 | — | — | — |
| Ethylene glycol (Y2) | 9.0 | 16.0 | 12.5 | 17.0 |
| Triethylene glycol-n-butyl ether | 3.0 | 3.0 | 3.0 | 3.0 |
| Polyethylene glycol 200 | 11.0 | 4.0 | 7.5 | 3.0 |
| Water | Balance | Balance | Balance | Balance |
| EVALUATION | | | | |
| Aggregation Evaluation | NG | G | G | G |

TABLE 9-continued

| | Comparative Example 16 | Comparative Example 17 | Comparative Example 18 | Comparative Example 19 |
|---|---|---|---|---|
| Preservation Stability Evaluation | G | NG | NG | NG |
| Absorption reduction rate | 3.6% | 6.1% | 5.2% | 5.5% |
| Comprehensive Evaluation | NG | NG | NG | NG |

Examples 1 to 9 and Comparative Examples 1 to 11

Comprising Glycerin

As summarized in Tables 1 and 2, each water-based ink of Examples 1 to 9 was good in both results of the aggregation evaluation and the preservation stability evaluation. In contrast, each water-based ink of Comparative Examples 1 to 3, 8, and 9 that satisfies Y1<3.5X−5 was good in the result of the preservation stability evaluation but inferior in the result of the aggregation evaluation. Further, each water-based ink of Comparative Examples 4 to 7, 10, and 11 that satisfies Y1>3.5X was good in the result of the aggregation evaluation but inferior in the result of the preservation stability evaluation.

Examples 10 to 18 and Comparative Examples 12 to 19

Comprising Ethylene Glycol

As summarized in Tables 3 and 4, each water-based ink of Examples 10 to 18 was good in both results of the aggregation evaluation and the preservation stability evaluation. In contrast, each water-based ink of Comparative Examples 12, 13, 15, and 16 that satisfies Y2<3.5X−5 was good in the result of the preservation stability evaluation but inferior in the result of the aggregation evaluation. Further, each water-based ink of Comparative Examples 14, 17, 18 and 19 that satisfies Y2>X+10 was good in the result of the aggregation evaluation but inferior in the result of the preservation stability evaluation.

It will be obvious to those having skill in the art that many changes may be made in the above-described details of the particular aspects described herein without departing from the spirit or scope of the invention as defined in the appended claims.

What is claimed is:

1. A water-based ink for ink jet recording comprising a coloring agent and water, wherein
the coloring agent comprises a dye represented by the following general formula (1), and in the ink, an amount of glycerin is set so as to satisfy the following condition (A):

$$3.5X-5 \leq Y1 \leq 3.5X \quad (A)$$

X: an amount of a dye represented by general formula (1) relative to a total amount of the ink (wt %)
Y1: an amount of glycerin relative to a total amount of the ink (wt %)
wherein the amount of glycerin relative to a total amount of the ink (Y1) is 8.5 wt % or lower;

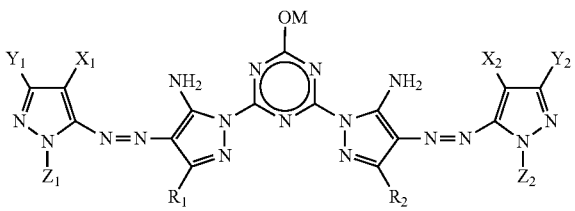

wherein in the general formula (1),
$R_1$, $R_2$, $Y_1$, and $Y_2$ each represents a monovalent group, provided that $R_1$, $R_2$, $Y_1$, and $Y_2$ may be the same or different;
$X_1$ and $X_2$, each independently, represents an electron attractive group, provided that $X_1$ and $X_2$ may be the same or different;
$Z_1$ and $Z_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that $Z_1$ and $Z_2$ may be the same or different; and
M represents a hydrogen atom or a cation.

2. The water-based ink according to claim 1, wherein in a case of X>5/3.5, glycerin is comprised in the ink in an amount satisfying the condition (A), and in a case of X≦5/3.5, glycerin is comprised in the ink in an amount satisfying the following condition (B):

$$0 < Y1 \leq 3.5X \quad (B)$$

X: an amount of a dye represented by general formula (1) relative to a total amount of the ink (wt %)
Y1: an amount of glycerin relative to a total amount of the ink (wt %).

3. The water-based ink according to claim 1, wherein in a case of X≦5/3.5, glycerin is not comprised in the ink.

4. The water-based ink according to claim 1, wherein the ink further satisfies the following condition (C):
(C) an amount of a dye represented by general formula (1) exceeds 0 wt % and is equal to or less than about 7 wt % relative to a total amount of the ink.

5. The water-based ink according to claim 1, wherein the ink is a water-based yellow ink.

6. A water-based ink for ink jet recording comprising a coloring agent and water, wherein the coloring agent comprises a dye represented by the following general formula (1), and
in the ink, an amount of ethylene glycol is set so as to satisfy the following condition (D):

$$3.5X-5 \leq Y2 \leq X+10 \quad (D)$$

X: an amount of a dye represented by general formula (1) relative to a total amount of the ink (wt %)
Y2: an amount of ethylene glycol relative to a total amount of the ink (wt %)

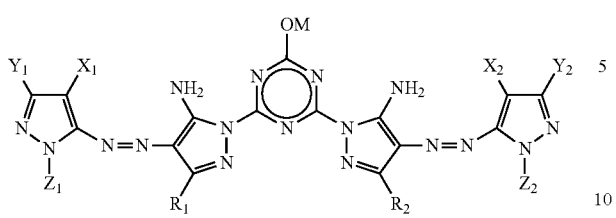

wherein in the general formula (1),

R$_1$, R$_2$, Y$_1$, and Y$_2$ each represents a monovalent group, provided that R$_1$, R$_2$, Y$_1$, and Y$_2$ may be the same or different;

X$_1$ and X$_2$, each independently, represents an electron attractive group, provided that X$_1$ and X$_2$ may be the same or different;

Z$_1$ and Z$_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that Z$_1$ and Z$_2$ may be the same or different; and M represents a hydrogen atom or a cation.

7. The water-based ink according to claim 6, wherein in a case of X>5/3.5, ethylene glycol is comprised in the ink in an amount satisfying the condition (D), and in a case of X≦5/3.5, ethylene glycol is comprised in the ink in an amount satisfying the following condition (E):

$$0 \leq Y2 \leq X+10 \tag{E}$$

X: an amount of a dye represented by general formula (1) relative to a total amount of the ink (wt %)

Y2: an amount of ethylene glycol relative to a total amount of the ink (wt %).

8. The water-based ink according to claim 6, wherein in a case of X≦5/3.5, ethylene glycol is not comprised in the ink.

9. The water-based ink according to claim 6, wherein the ink further satisfies the following condition (F):

(F) an amount of a dye represented by general formula (1) exceeds 0 wt % and is equal to or less than about 6 wt % relative to a total amount of the ink.

10. The water-based ink according to claim 6, wherein the ink is a water-based yellow ink.

11. An ink cartridge comprising the water-based ink according to claim 1.

12. An ink cartridge comprising the water-based ink according to claim 6.

13. An ink jet recording apparatus comprising the ink cartridge according to claim 11 and an ink ejection unit, wherein a water-based ink comprised in the ink cartridge is ejected from the ink ejection unit.

14. An ink jet recording apparatus comprising the ink cartridge according to claim 12 and an ink ejection unit, wherein a water-based ink comprised in the ink cartridge is ejected from the ink ejection unit.

15. A method of stabilizing a water-based ink for ink jet recording comprising a coloring agent and water, wherein the coloring agent comprises a dye represented by the following general formula (1), and the ink is stabilized by setting an amount of glycerin so as to satisfy the following condition (A) in the ink:

$$3.5X-5 \leq Y1 \leq 3.5X \tag{A}$$

X: an amount of a dye represented by general formula (1) relative to a total amount of the ink (wt %)

Y1: an amount of glycerin relative to a total amount of the ink (wt %)

wherein the amount of glycerin relative to a total amount of the ink (Y1) is 8.5 wt % or lower;

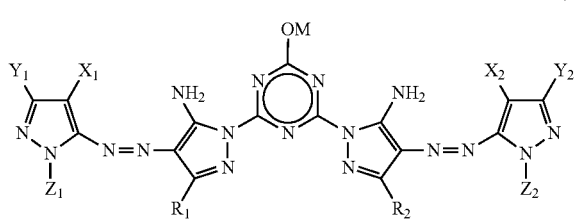

wherein in the general formula (1),

R$_1$, R$_2$, Y$_1$, and Y$_2$ each represents a monovalent group, provided that R$_1$, R$_2$, Y$_1$, and Y$_2$ may be the same or different;

X$_1$ and X$_2$, each independently, represents an electron attractive group, provided that X$_1$ and X$_2$ may be the same or different;

Z$_1$ and Z$_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that Z$_1$ and Z$_2$ may be the same or different; and M represents a hydrogen atom or a cation.

16. A method of stabilizing a water-based ink for ink jet recording comprising a coloring agent and water, wherein the coloring agent comprises a dye represented by the following general formula (1), and the ink is stabilized by setting an amount of ethylene glycol so as to satisfy the following condition (D) in the ink:

$$3.5X-5 \leq Y2 \leq X+10 \tag{D}$$

X: an amount of a dye represented by general formula (1) relative to a total amount of the ink (wt %)

Y2: an amount of ethylene glycol relative to a total amount of the ink (wt %)

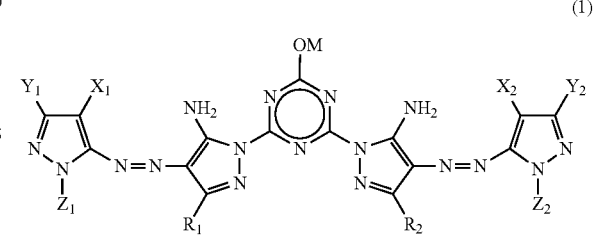

wherein in the general formula (1),

R$_1$, R$_2$, Y$_1$, and Y$_2$ each represents a monovalent group, provided that R$_1$, R$_2$, Y$_1$, and Y$_2$ may be the same or different;

X$_1$ and X$_2$, each independently, represents an electron attractive group, provided that X$_1$ and X$_2$ may be the same or different;

$Z_1$ and $Z_2$, each independently, represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, provided that $Z_1$ and $Z_2$ may be the same or different; and M represents a hydrogen atom or a cation.

* * * * *